Figure 1:
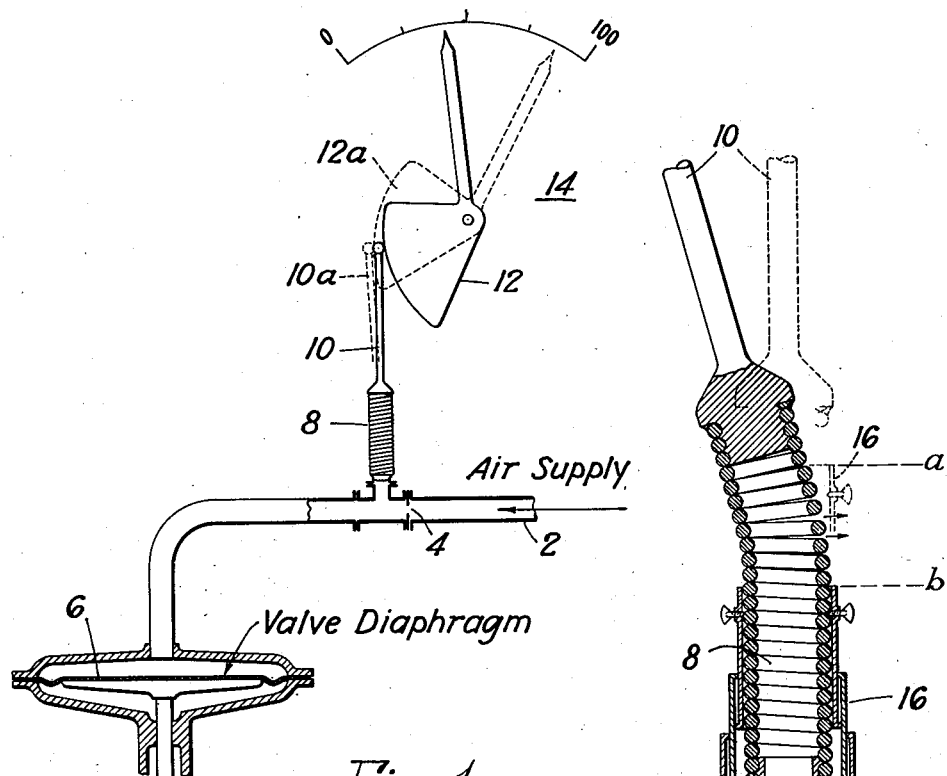

May 19, 1953     T. P. MONAHAN     2,638,925
HELICAL SPRING VALVE
Filed March 23, 1949

INVENTOR.
Thomas P. Monahan
BY
ATTORNEY

Patented May 19, 1953

2,638,925

UNITED STATES PATENT OFFICE 2,638,925

HELICAL SPRING VALVE

Thomas P. Monahan, Salt Lake City, Utah, assignor to Utah Oil Refining Company, Salt Lake City, Utah, a corporation of Utah Application March 23, 1949, Serial No. 82,943

2 Claims. (Cl. 137—655)

The present invention relates to an improved apparatus for maintaining within closely defined limits the pressure of gases in an enclosed vessel and relates particularly to means for automatically varying the pressure in pneumatic and in hydraulic control systems in response to a controlling signal. The invention has particular reference to apparatus for controlling the pressure and the flow of gases in a pipe and of adjusting within said close limits pressure systems that constitute in themselves means for providing automatic controls.

As is well known, orifice meters, U-gauges, diaphragm valves, and the like, have long been employed in fluid measurement and automatic control equipment. One class of such automatic control equipment includes pressure escape valves of which one species is the tightly coiled helical spring which can be welded or otherwise fastened into a pipe at an opening thereof and be so balanced against the pressure in the pipe that excessive pressures therein will press against a piston or similar device retaining the outer end of the helical spring and will thus extend the helix and permit escape of gases between the coils of the extended spring. The device has been found advantageous because it consists of substantially no moving parts and thus will not get out of order, but in order to provide a properly tight seal and prevent leakage of gases along the coil, it has been necessary to employ such heavy coils that a delicate adjustment for control apparatus has not been feasible and the use of the helical springs has been limited to escape valve and muffler apparatus. It is an object of the present invention to provide apparatus having the simplicity of construction of the aforesaid helical springs and the accompanying absence of moving parts along with a sensitivity making the apparatus valuable in control systems.

It is another object of the invention to provide a valve controlling apparatus which is responsive to minute changes in any automatically measurable operating condition. It is a further object of the invention to provide an automatic control mechanism that is adjustable separately with respect to sensitivity and to the range of selected operating conditions. It is yet another object of the invention to provide a simply constructed sensitive control means automatically responsive to a measurable operating factor and particularly applicable to hydraulically and/or pneumatically operated control systems. Other objects will become apparent in the specification and claims hereinafter made.

Briefly stated, apparatus of the present invention consists, in combination, of an enclosed pressure system or vessel or pressure retaining means, either a drum, tank or a pipe through which a fluid may or may not be flowing; a tightly wound helical spring preferably of cylindrical conformation, the coils of which are firmly held together when the spring is in static position under ordinary conditions, the said spring being inserted into and completely closing an opening in the said vessel or, preferably, being attached to a conduit between the vessel and the system for holding a fluid under pressure, and extending outwardly therefrom; a gas or air-tight closure at the opposite end of the helical spring, the said closure or plug being preferably, but not necessarily, extended so as to form a rod or lever arm; and metering or other automatic measuring apparatus such as a pressure gauge, flowmeter, or thermostat, having a movable member operably connected to the upper section of the spring or the lever, or bearing against the spring or lever, so that movement of the member will tilt the lever and in any case the spring and thereby separate at least two adjacent coils of the helical spring and permit the passage therethrough of fluid from the vessel. In one example of the apparatus, a shield of adjustable height can be positioned around the helical spring for a portion of the length thereof or equivalent means can be employed so that the spring will no longer pivot or bend from the point of its connection to the said vessel or conduit, but will pivot at a higher point along the length of the spring thereby shortening the functional length thereof and increasing the sensitivity and speed of response of the apparatus as will be hereinafter described.

Figure 3:
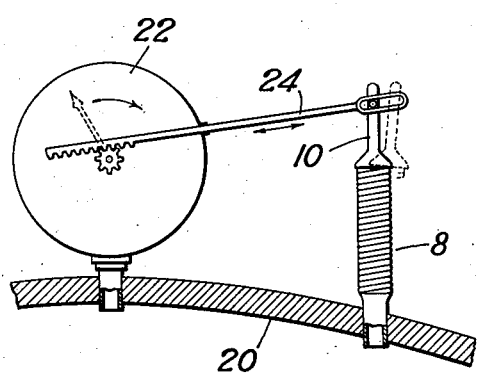
Figure 2:
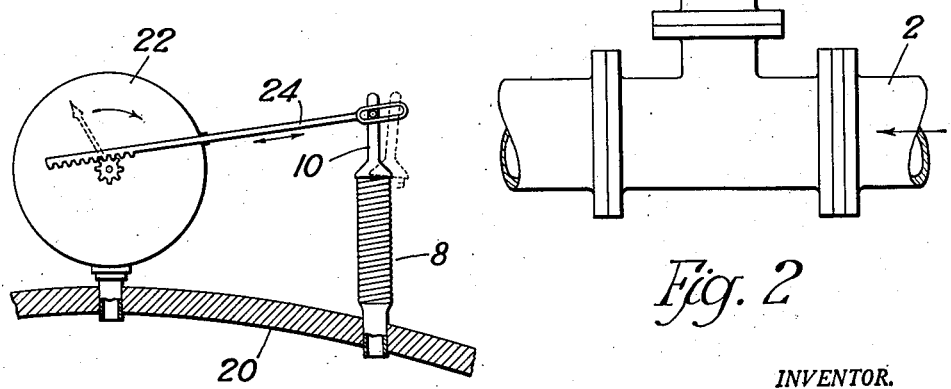

In the accompanying drawings, forming a part of this specification:

Figure 1 is a diagrammatic sketch embodying the apparatus of the invention in combination with a pneumatic control device;

Figure 2 is an elevational view of that portion of the apparatus of Figure 1 which embodies the present invention with the parts in longitudinal cross section and parts broken away, with a modification herein shown of a device for adjusting the sensitivity of the apparatus; and Figure 3 is an elevational view with parts broken away of apparatus whereby pressure can be uniformly maintained within close limits within a pressure vessel.

According to the invention as illustrated in Figure 1, a line 2, to which is supplied air under uniform pressure from a source not shown, is provided with an orifice plate 4 and is terminated at a control diaphragm 6 which may be a pneumatically operated valve or other control mechanism sensitive to variations in air pressure. A vertically extending, tightly wound helical spring 8 is welded securely to the open end of a conduit 9 that is disposed at an opening in the line 2 between the orifice plate 4 and the diaphragm 6. The said opening in the pipe 2 is placed between the diaphragm 6 and orifice plate 4 which has an orifice small enough to act as a throttle means and permit a lowering of the pressure and operation of the diaphragm valve when the helical spring 8 is tilted. The helical spring 8 may be welded to the line 2 or to the conduit 9 which can thereafter be tapped into the pipe at the said opening or otherwise secured thereto. In any case, the spring should be so fastened to the pipe that it will not extend into the path of fluids which may flow in the pipe 2 and it should be fastened securely to the edges of the pipe around the opening therein so that there will be no leakage between the said edges and the spring 8. At the opposite end of the spring 8, there is permanently and securely fastened into the spring so as to close the helical opening of the spring, a lever 10. The lever 10 is welded or otherwise secured to the top of the spring 8 or to any intermediate fitting, not shown, in such secure manner that no leakage will occur between the edges of the lever and the upper coils of the spring at the point of fastening. The upper end of the lever 10 is in bearing relationship with a cam 12 that is operated in the present embodiment by the flow of steam through a pipe, not shown. In a working installation of the described apparatus, the steam flow meter measures the flow of steam from a boiler, not shown, that is heated by a gas fire supplied with air by a forced draft controlled by the pneumatic control system shown in essential parts in the drawing as pipe 2 and diaphragm 6.

The operation of the above described apparatus proceeds in the following manner. The air pressure in the line 2 may be set at any given pressure, say from two to ten pounds per square inch, by valve or other constant pressure maintaining mechanism known in the art so that a substantially uniform controlled amount of air is delivered by a forced draft to a combustion system. However, when, as in the present instance, variations in the heat content of fuel gas delivered to the said combustion are encountered and the resultant variation in the flow of steam is observed, the aforesaid cam 12 will be moved as an operating part of the steam flow meter 14 and in movement will move to, for example, the second position indicated by the cam 12 as shown in dotted lines 12a on the drawing. The lever 10 is then shifted in position to the one shown by dotted lines on the drawing (10a). This shift in the position of the lever will open spaces between coils of the spring 8 along the right side thereof and will permit an escape of air and a consequent change in the pressure upon the diaphragm 6. As is well known, the change in pressure on the diaphragm 6 will effect a change in the supply of combustion air to the boiler, and the steam rate will be restored to its former uniform value.

It is, of course, obvious that various situations involving widely different variables of pressure, flow rate, and the like, will require a coil of different strength, orifices of different diameter, and spring wire of different gauge. These could readily be calculated by one skilled in the art by reference to the standard orifice formulas and a coordination therewith to the requirements of the specific apparatus to which a control means of invention are to be adapted.

Referring now to Figure 2, the helical spring 8 is shown inserted in the pressure control line 2 in a manner similar to that of Figure 1. Again, an element bears against the extension lever 10 and this element can be the bearing surface of the cam 12 of Figure 1, or a moving element of any meter, thermostat, scale or other measuring device by which it is desired to control the subject of the shown control apparatus. A telescoping, adjustable sleeve 16 is shown in cross section disposed around the helical spring 8. It can be raised by extension thereof as high as point a. When the sleeve is extended so that the upper edge thereof is opposite the point a, a movement of the lever 10 will more abruptly separate coils of the spring 8 and release pressure of air in the pipe 2. When the sleeve 16 is in a lower position with the upper edge thereof opposite point b as shown in the drawing, a correspondingly greater movement of the lever will be required to release pressure of air from the pipe 2. This sleeve will not only make the device more sensitive but will also tend to eliminate a slight lag that may be encountered with long springs.

The upper section only of a pressure vessel 20 is shown in Figure 3, and pressure gauge 22 represents any gauge of conventional construction having a moving part indicating the pressure existing within the said vessel 20. Disposed in operating relationship to the said gauge 22 is a helical spring 8 set in an opening in the said tank. The helical spring 8 is closed at its upper end by an extension lever 10, one end of which is welded or otherwise fastened to the spring in a manner similar to that described with reference to Figure 1. Bearing against the lever 10 is a movable member 24 of the said pressure gauge 22 in such operative relationship that movements of the member 24 will be transmitted to the lever 10 and effect a bending of the spring 8 and the resultant release of pressure from the said tank 20. It is clear that minute variations of pressure in the tank 20 will be immediately corrected by the operation of the described apparatus of invention. It is observed, furthermore, that the spring 8 also will operate as an escape valve in known manner and that its cooperation with the movable member 24 and its operation in response thereto will not interfere with such operation of the spring 8 as such escape valve. Sudden surges of excessive pressure will exert a corresponding pressure against the base of the lever 10, which closes the upper end of the spring 8, and will cause an immediate extension of the spring 8 and immediately prevent any retention of extreme pressures within the vessel 20.

A modification of the apparatus can readily be constructed in which the helical spring and the opening in the pipe to which it is attached are enclosed in a second pipe so that gases bled from the first pipe can be confined and directed as desired. This arrangement will, of course, require the movable member of the gauge or metering apparatus or the like, which is used as the controlling factor, to be inserted through the wall of the second pipe through a packed gland or the like which will permit movement and prevent leakage. This arrangement is effective as a proportioner. The movable member can be operated by a flowmeter downstream of the spring apparatus or by a balancing arrangement between the flowmeters on this and a second line in which respective gas flows are to be proportioned.

Although the spring control apparatus of the present invention as shown herein in operative application to but a few embodiments, in view of the above description, its application to other systems of control apparatus will be clear to one skilled in the art. It has been found in extended experimental study of the apparatus in an application similar to that shown in Figure 1, that the apparatus remains operative over extended periods without need for repair, that the nature of the apparatus is such that the bleeding of escape gases through separate coils causes less noise than is ordinarily encountered by escaping gases and that it is, moreover, resistant to vibration, either that caused by the escaping gases or vibrations of the control apparatus.

Having now described and illustrated my apparatus of invention, I claim:

1. A combustion control apparatus comprising a meter having a movable member responsive to changes in pressure, a pressure conduit, a diaphragm valve at one end of said pressure conduit the diaphragm of which is responsive to changes in fluid pressure within said conduit, a helical spring with one end firmly fastened in substantially air tight fluid communication with said conduit, the said spring being tightly wound and of such strength that the tightly wound coils thereof will bear against each other and consequently prevent leakage of fluid therebetween, a sleeve of adjustable length surrounding a portion of the said helical spring and fixedly attached at the said one end at which the said spring is fastened, and a closure at the opposite, unfastened end of said spring, the said closure forming a rod extending outwardly along the axis of said spring, the outwardly extending portion of said rod bearing laterally against the said movable member so that when the member moves in response to changes in pressure the outwardly extending portion of the rod will be moved laterally and will bend the said spring by lever action and will hold the spring at such bent position as dictated by the position of the said movable member whereby fluid is released from the conduit.

2. A pressure control apparatus that is governable by variable responsive means to release fluid from a retaining means wherein the fluid is held under pressure, the said apparatus comprising: a helical spring set into an opening of the said retaining means and fastened to the said means, the said helical spring being tightly wound and of such strength that the tightly wound coils thereof will bear against each other and, consequently, prevent leakage of fluid therebetween; a closure for the said spring at the end opposite to the opening in the fluid retaining means; a sleeve of adjustable length surrounding a portion of the said helical spring and being fixedly attached at the same end at which the helical spring is fastened; and a member that is separate and distinct from said spring, and is laterally disposed in a position against the spring so that movement of the said member will cause a resultant lateral bending of the helical spring and a retention of the spring in such bent position whereby the fluid retained in the said retaining means will escape through apertures exposed between coils of the spring separated by the said bending thus reducing the pressure in the said fluid retaining means.

THOMAS P. MONAHAN.

References Cited in the file of this patent

UNITED STATES PATENTS

| Number | Name | Date |
|---|---|---|
| 125,937 | Cowles | Apr. 23, 1892 |
| 1,760,315 | Nacket | May 27, 1930 |
| 1,909,469 | Hubbard | May 16, 1933 |